UNITED STATES PATENT OFFICE.

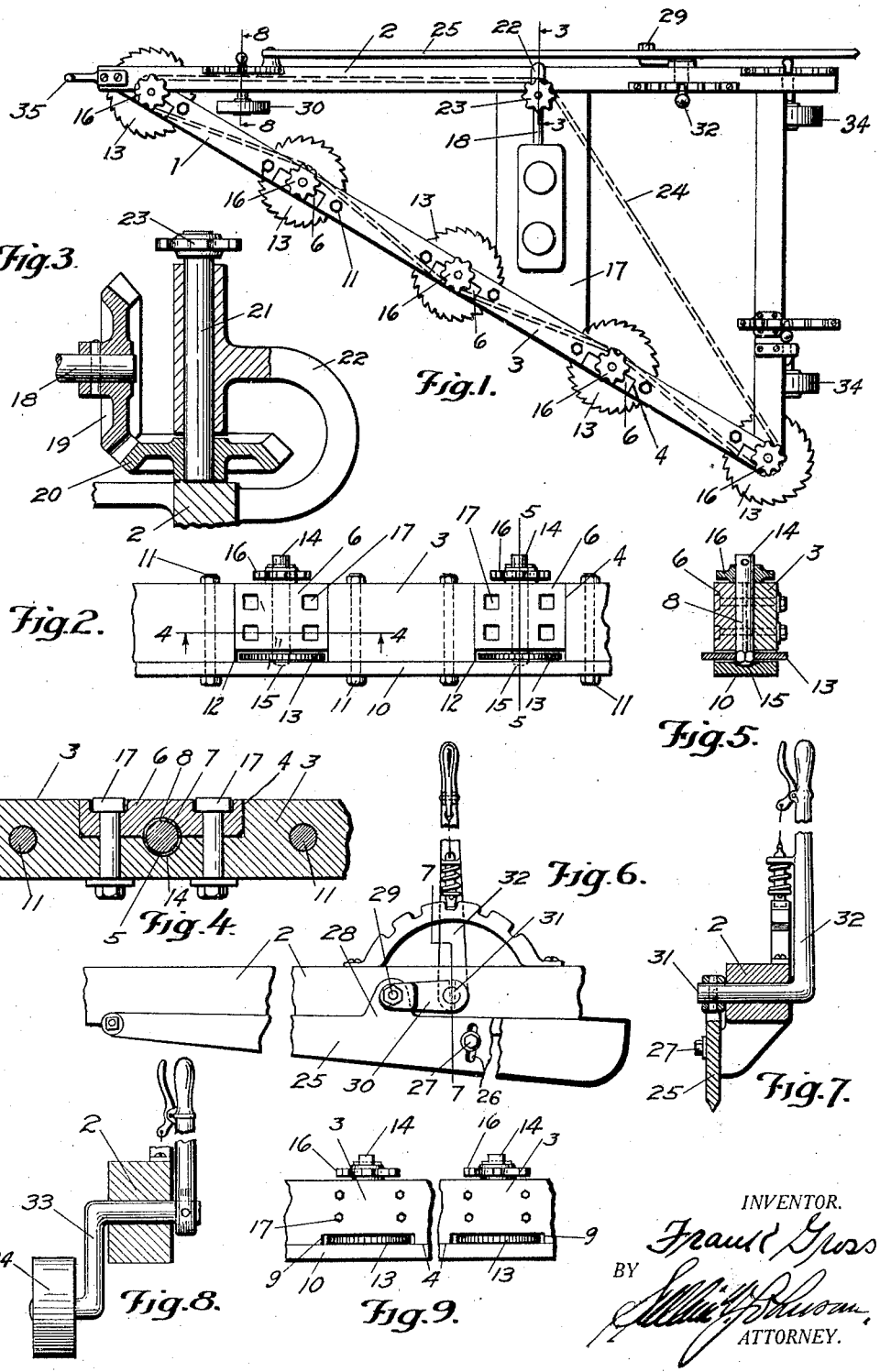

FRANK GROSS, OF LOUISVILLE, COLORADO.

BRUSH-CUTTER.

1,346,197.  Specification of Letters Patent.  Patented July 13, 1920.

Application filed November 28, 1919. Serial No. 341,131.

*To all whom it may concern:*

Be it known that I, FRANK GROSS, a citizen of the United States, residing at Louisville, in the county of Boulder and State of Colorado, have invented new and useful Improvements in Brush-Cutters, of which the following is a specification.

The present invention is directed to improvements in agricultural implements, and more particularly to implements for cutting brush, weeds, stubble and the like.

The invention has for its object to provide a device of this character so constructed that the same can be drawn across a field to cut the brush and other objectionable growths.

Another object of the invention is to provide a device of this character including a plurality of alined rotary cutters adapted to be rotated as the device is being drawn across the field.

Another object of the invention is to provide a novel form of cutter carrying beam so constructed that one cutter can be removed for repairs or replacement without the necessity of removing the others.

A still further object of the invention is to provide means to prevent lateral movement of the device when the cutters are severing the growths, thus assuring that the device will travel in a straight line across the field.

With these and other objects in view, this invention resides in the novel features of construction, formation, combination and arrangement of parts to be hereinafter more fully described, claimed and illustrated in the accompanying drawing, in which:—

Figure 1 is a top plan view.

Fig. 2 is a fragmentary side elevation.

Fig. 3 is a sectional view on line 3—3 of Fig. 1.

Fig. 4 is a sectional view on line 4—4 of Fig. 2.

Fig. 5 is a sectional view on line 5—5 of Fig. 2.

Fig. 6 is a detail side view of the land blade.

Fig. 7 is a sectional view on line 7—7 of Fig. 6.

Fig. 8 is a sectional view on line 8—8 of Fig. 1.

Fig. 9 is a fragmentary side elevation opposite to Fig. 2.

The device comprises a frame 1 which consists of beams 2 and 3, the latter being disposed in acute angular relation to the former. Thus the beam 3 is disposed obliquely to the line of travel of the frame.

The beam 3 is formed with a plurality of rectangular seats 4, the inner vertical walls of which are formed with semicircular grooves 5, the purpose of which will appear later. Blocks 6 are provided, and have their inner faces formed with grooves 7 corresponding in shape to the grooves 5 so that when the blocks 6 are in the seats 4 the grooves 5 and 7 provide bearings 8.

The beam 3 has its lower edge provided with recesses 9 which coincide with the seats 4, and open downwardly and are closed by the bar 10 which extends longitudinally of said beam and is secured thereto by bolts 11. The lower edges of the blocks 6 are spaced from the bar 10 and form in conjunction therewith recesses 12, said recesses being alined with the recesses 9. Rotatably mounted in these recesses are cutter disks 13, said disks being fixed to the shafts 14, the extreme lower ends of which are journaled in the bearings 15 formed in the bar 10. The aforesaid shafts are journaled in the bearings 8 and have their upper ends extended above the plane of the beam 3, and to the extended ends are fixed sprocket wheels 16, the purpose of which will appear later.

Bolts 17 are employed and are passed through the blocks 6 and beam 3, and serve to hold the blocks rigidly engaged in the seats 4, as clearly shown in Fig. 5.

A platform 17 is supported between the beams 2 and 3, and on this platform is mounted an engine the shaft 18 of which has fixed thereon a bevel gear 19 which in turn meshes with a similar gear 20, said gear being fixed to a shaft 21. The shaft 21 is rotatably supported in a bracket 22 fixed to the beam 2, and has fixed to its upper end a sprocket wheel 23. Thus the sprocket chain 24 is driven by the sprocket wheel 23, and since this chain is trained around the sprocket wheels rotary movement is imparted to the shafts 14, and thus to the cutter disks 12. The chain is preferably engaged with alternate sides of the sprocket wheels so that the cutter disks will rotate in opposite directions.

When the undergrowth or brush is thick the frame 1 has a tendency to move laterally owing to the angular position the beam 3 has with respect to the beam 2, and to prevent this a land blade 25 is employed, and has its forward end pivotally connected to the beam 3. A guide slot 26 is formed in the blade and engaged in this slot is a lug 27, said lug being supported by the beam 2. The upper edge of the blade is provided with an ear 28 to which is pivotally connected a pin 29, said pin being carried by a link 30. The link 30 is associated with a stub shaft 31 which is journaled in the beam 2 and has a lever 32 connected therewith, said lever serving to rock the shaft 31 thus swinging the link 30 and pin 29 to raise or lower the land blade 25. Thus the blade 25 may be raised when not in use, and readily lowered through the medium of the lever 32 so as to cut into the ground to prevent lateral movement of the device when in motion.

Crank axles 33 are located at suitable points on the frame 1, and are provided with wheels 34, said axles being adjustable in any conventional manner so that the frame 1 may be adjusted vertically to regulate the cutting action of the disks 13.

To the forward end of the frame 1 is secured a clevis 35 to which a tractor or draft animals may be attached to draw the device across a field.

It will be understood that various changes in size, shape, proportion and minor details of construction may be resorted to without departing from the spirit or sacrificing any of the advantages of the invention.

What is claimed is:—

1. A brush cutter comprising a frame consisting of a pair of beams, one beam having seats formed therein, grooves in the seats, blocks removably mounted in the seats and having grooves carried thereby for alinement with the grooves of the seats, said grooves forming bearings, shafts rotatable in the bearings, and having cutting disks fixed to their lower ends, as and for the purpose set forth.

2. A brush cutter comprising a pair of beams, one beam having seats formed therein, the rear walls of which being formed with grooves, and recesses, a bar extending longitudinally of the beam and closing the lower end of the recesses, blocks having grooves formed therein, said blocks being removably mounted in the seats and having their grooves in alinement with the first named grooves to form bearings, shafts rotatable in the bearings, cutting disks fixed to the shafts and operable in the recesses and below the blocks, means for rotating the shafts, and means for raising or lowering the beams.

3. A brush cutter comprising a frame consisting of a pair of beams, cutting disks rotatably associated with one of the beams, and a land engaging blade having its forward end pivotally connected to the other beam, means for swinging the blade on its pivot, said blade serving to prevent lateral movement of the frame when in motion and the blade is engaged in the ground.

In testimony whereof I have hereunto set my hand in presence of two subscribing witnesses.

FRANK GROSS.

Witnesses:
 FLORENCE VANNATTA,
 H. G. WOLFF.